United States Patent [19]
Brosnan

[11] 4,343,989
[45] Aug. 10, 1982

[54] MAGNESIUM OXIDE BASED HEAT STORAGE DEVICE

[76] Inventor: Denis A. Brosnan, 217 Avondale Dr., Tullahoma, Tenn. 37388

[21] Appl. No.: 209,692

[22] Filed: Nov. 24, 1980

[51] Int. Cl.³ .................. C04B 35/04; F24H 7/00; H05B 3/02
[52] U.S. Cl. .................. 219/378; 501/119; 501/124; 501/112; 501/114; 219/341; 219/365; 219/530; 219/540; 126/450; 165/104.11; 165/104.15; 165/DIG. 4
[58] Field of Search .......... 106/58, 59, 60, 62, 106/63, 64; 219/341, 365, 378, 399, 430, 439, 530, 540; 501/119, 124, 114, 112; 126/400; 165/104.11 A, 104.15, DIG. 4

[56] References Cited

U.S. PATENT DOCUMENTS

| | | | |
|---|---|---|---|
| 1,854,899 | 4/1932 | Goldschmidt | 106/60 |
| 1,926,094 | 9/1933 | Goldschmidt et al. | 106/60 |
| 2,077,795 | 4/1937 | Harvey et al. | 106/60 |
| 2,105,943 | 1/1938 | Goldschmidt | 106/60 |
| 2,252,317 | 8/1941 | Goldschmidt | 106/59 |
| 2,335,407 | 11/1943 | Goldschmidt | 106/59 |
| 2,418,026 | 3/1947 | Goldschmidt | 106/59 |
| 2,511,724 | 6/1950 | Lobaugh | 106/64 |
| 2,516,249 | 7/1950 | Osborn | 106/60 |
| 2,537,218 | 1/1951 | Giles | 106/62 |
| 3,138,470 | 7/1964 | Davies et al. | 106/62 |
| 3,624,356 | 11/1971 | Havill | 219/378 |
| 3,802,894 | 4/1974 | Prost | 106/64 |
| 4,102,695 | 7/1978 | Claverie | 106/64 |
| 4,244,745 | 1/1981 | Havranek et al. | 106/58 |

FOREIGN PATENT DOCUMENTS

| | | | |
|---|---|---|---|
| 1209476 | 1/1966 | Fed. Rep. of Germany | 106/73.4 |
| 1273602 | 5/1972 | United Kingdom | 219/365 |

OTHER PUBLICATIONS

Palmour III, H. et al., "Ceramics for Energy Storage Units: Bricks From North Carolina Olivini for Heat Storage Furnaces" Presented at CIMTEC IV: Energy & Ceramics, St. Vincent, Italy, May 28–Jun. 1,1979.

Greaves-Walker, A. et al. The Production of Unfired and Fired Forsterite Refractories from North Carolina Dunites.

*Primary Examiner*—Mark Bell
*Attorney, Agent, or Firm*—Ralph Bailey; John B. Hardaway, III

[57] ABSTRACT

A cast magnesium oxide based structure is utilized as a heat storage material. In preferred embodiments, the magnesium oxide heat storage material is cast directly about a source of heat. In another embodiment, a block of cast magnesium oxide based heat storage material is placed in contact with a source of heat forraising the temperature and storing heat and later moved to a different environment for transferring heat to that environment.

12 Claims, 4 Drawing Figures

MAGNESIUM OXIDE BASED HEAT STORAGE DEVICE

BACKGROUND OF THE INVENTION

This invention relates generally to the art of ceramic heat storage devices, and, more particularly, to a magnesium oxide based cast storage device formed without the conventional step of firing.

Some European countries presently operate on an electrical power rate structure which offers reduced rates at off-peak times. Thus, during times of high electrical consumption, the cost per kilowatt hour is significantly higher than during the off-peak times. For example, peak loads occur during the time period from 5:30 a.m. to 9:00 a.m. when houses are reheated after being allowed to cool during the nighttime. Bathing and dishwashing also take place during this period of time to further increase the electrical demand.

With the advent of off-peak pricing, a financial incentive for lifestyle change came into existence. As a part of this pricing scheme, night heat storage devices came into popular use within Europe. Conventionally such heat storage devices have comprised bricks high in magnesium oxide content. Such bricks have been stacked around or assembled around an electrical heat source and permitted to accumulate heat during periods of off-peak pricing. The object of such a scheme is to have the bricks fully charged with heat at the transition from the off-peak rate to the on-peak rate. Thus fully charged night storage bricks slowly dissipate their heat throughout the on-peak time. Generally such bricks are heated in areas near the electrical resistance source to a temperature of approximately 1500° to 1600° F. and exhibit at the interface with the room a temperature of approximately 150° F. The overall philosophy and development of night heat storage devices is described in a paper presented by H. Palmour, III et al at Cimtec 4 during 1979 at St. Vincent, Italy, and later published by Elsevier Publishing Company of Amsterdam, Holland.

As is described in the paper by Palmour, III et al these night storage bricks are formed by conventional ceramic sintering processes which require very low aluminum oxide contents in order to maintain the necessary refractoriness generally associated with ceramic products. An upper limit of 2.5 percent aluminum oxide was stated to exist for an olivine suitable for use in a night storage brick.

Olivine minerals have been used in refractory products for many years. U.S. Pat. Nos. 1,926,094; 2,252,317; 2,105,943; and 2,335,407 deal with the conversion of hydrous magnesium silicates in olivines and serpentines into the refractory mineral forsterite, 2 $MgO.SiO_2$, which melts at about 3450° F., or with the processing of these aggregates into brick or other shapes. These bricks are sintered at temperatures within the range of 2300° to 2500° F. for considerable periods of time, e.g., 5 hours, in order to develop sufficient mechanical strength for the article to be useful in commerce.

Harvey et al disclose in U.S. Pat. No. 2,077,795 that lime is an acceptable impurity in forsterite brick as long as the lime content does not exceed more than about 6 percent by weight. U.S. Pat. No. 2,516,249 to Osborne discloses additions of aluminum oxide to olivine in order to lessen the tendency toward bursting expansion under exposure to alternating oxidizing and reducing atmospheric conditions. This invention was commercially utilized in the steel industry until the basic slag practices became conventional. Davies et al disclose in U.S. Pat. No. 3,138,470 the use of improved forsterite aggregate. Greaves-Walker et al disclose in Bulletin No. 16, Engineering Experimental Station, North Carolina State College of Agriculture and Engineering, August 1943, the production of forsterite refractories in both the fired and unfired states utilizing various bonding agents including calcium aluminate cements. These refractories are intended for use in the steel industry and contain as a part of their constituents calcined material.

SUMMARY OF THE INVENTION

It is thus an object of this invention to provide a magnesium oxide based heat storage material which may be cast into a desired geometry without the conventional ceramic sintering process.

It is a further object of this invention to provide a heat storage device utilizing such a cast magnesium oxide based material as the heat storage material.

It is a still further object of this invention to provide a process of producing such a device.

It is a yet further object of this invention to provide a process of heat storage utilizing a cast magnesium oxide based material as a heat storage material.

These, as well as other objects are accomplished by utilizing a cast magnesium oxide based material for heat storage. In preferred embodiments, the magnesium oxide heat storage material is cast directly about a source of heat. In another embodiment, a block of cast magnesium oxide based heat storage material is placed in contact with a source of heat for raising the temperature and storing heat and later moved to a different environment for transferring heat to that environment.

DETAILED DESCRIPTION

In accordance with this invention, it has been found that a heat storage device may be produced from a cast magnesium oxide based material. The cast structure is produced without the benefit of conventional ceramic firing processes to form ceramic bonds by the mechanism of sintering. For purposes of this invention, the term "without conventional sintering" or "without conventional firing processes" means without heating above a temperature of 1,000° F. for the purpose of densification and assuring structural integrity. This definition, however, does not exclude in service use at temperatures above 1,000° F.

The cast structures in accordance with this invention derive their structural and dimensional integrity from the use of a calcium aluminate cement rather than by conventional ceramic processing at temperatures greater than 1,000° F., e.g., 3,000° F. For purposes of describing this invention, reference will be had to the appended Figures of drawing.

Figure 1:
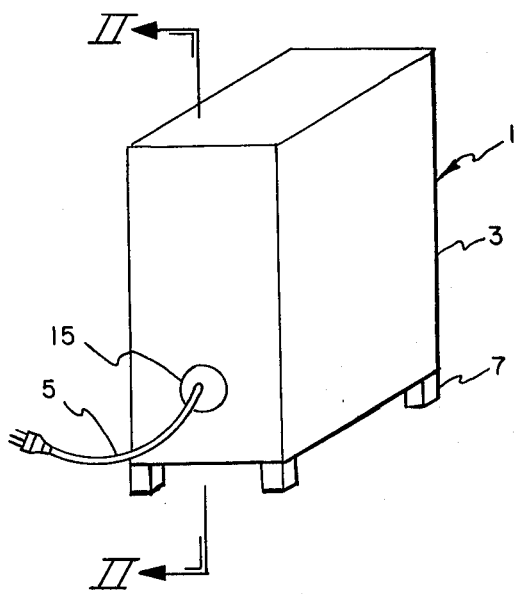
FIG. 1 is an isometric view of a heat storage device in accordance with this invention.

FIG. 1 of the drawings illustrates in isometric view a heat storage device in accordance with this invention. The heat storage device of FIG. 1 comprises a cast mass 3 of magnesium oxide based heat storage material which is in communication with a source of heat illustrated here as an electrical source 5. The cast structure as illustrated in FIG. 1 may be on the order of the size of a conventional radiator with dimensions of approximately 3 feet by 3 feet by 1 foot. The structure may rest upon support means illustrated here as legs 7.

Figure 2:
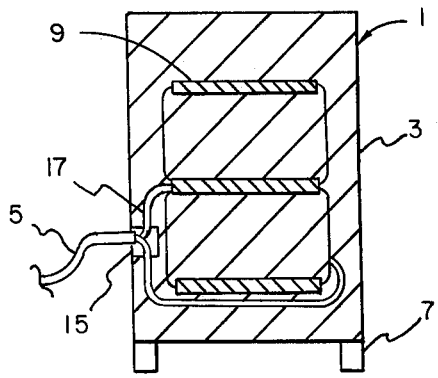
FIG. 2 is a cutaway along line II—II of FIG. 1.

FIG. 2 of the drawings illustrates a cross section along the line II—II of FIG. 1. Shown in FIG. 2 are sources of heat 9 communicating with the source of electrical power 5. The heating elements in FIG. 2 are in the form of heating rods connected in parallel for the purpose of heating the magnesium oxide based storage material 3. The heating rods 9 may be of the type of heating rods which are conventionally used and commercially available for various elevated temperature applications. Such heating rods are conventionally formed of nickel chromium alloys, but may be of other materials, such as molybdeneum disilicide.

Figure 4:
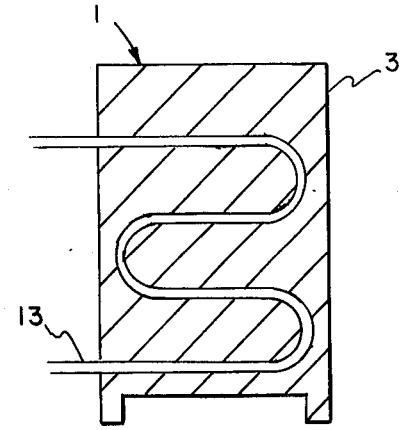
FIG. 4 is a cutaway view similar to FIG. 2 illustrating yet another alternative heat source.
Figure 3:
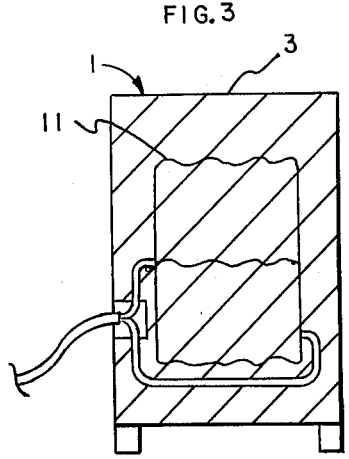
FIG. 3 is a cutaway view similar to FIG. 2 showing an alternative heat source.

Another form of electrical resistance heating means is shown in FIG. 3 wherein resistive wire 11 is utilized for the heat source. An additional heating source is illustrated in FIG. 4 wherein a heat transfer fluid may be conducted through heat transfer tubing 13 for the purpose of heating the magnesium oxide based heat storage material 3.

The device as shown in the Figures of the drawings does not have an outer shell for decorative purposes. However, it is understood that an outer shell of thin sheet metal may be utilized for decorative purposes. The device additionally shown is adapted for heat transfer to the environment by radiation. However, it is understood that it may be desirable to provide fins on the exterior of the device and blowing means to transfer heat to the environment by convection.

In actual operation of the device, the source of heat is routinely operated at a temperature of 1500° to 1600° F. and even up to 1800° F. for the purpose of warming the magnesium oxide based heat storage material to elevated temperatures. Typically, however, the surface exposed to the environment should not exceed a temperature of 150° F. in order to avoid safety problems. It is thus seen that with a massive device heated to an elevated interior temperature, substantial heat storage is achieved. Typically, the material in accordance with this invention has a volumetric heat capacity of greater than 0.55 calories per gram per cubic centimeter.

In broad terms, the magnesium oxide based heat storage device of this invention is simply produced by casting a magnesium oxide bearing material utilizing a calcium aluminate cement for the purpose of binding the magnesium oxide based material into a desired geometry. The structure is dried and cured after casting into a dimensionally stable structure by heating to a temperature in excess of 95° F. for a sufficient period of time to decompose unstable hydrates.

The cast structure in accordance with this invention possesses several unexpected and surprising properties. While the cast structure may be produced from high purity magnesium oxide, it is preferably produced from sources not heretofore thought to possess sufficient refractoriness for ceramic applications and material which is thus sufficiently cheaper than material which has been utilized heretofore. Secondly, the costly processing step of firing for the purpose of sintering and forming ceramic bonds is eliminated. This firing elimination not only results in reduced product costs but also reduced energy consumption and deleterious atmospheric effects brought about by high firing processes.

The combination of the above results in a product cost which is substantially less, e.g., 80 percent, than conventionally produced heat storage devices.

The magnesium oxide based heat storage material utilized in this invention may be derived from many sources. It may be industrially pure magnesium oxide but preferably is a magnesium oxide bearing mineral which is otherwise considered unsuitable for refractory purposes. The mineral olivine is a preferred source of magnesium oxide heat storage material, but pure forsterite, recycled magnesite, talc, serpentine and mixtures thereof may be utilized within the scope of this invention. Such mineral sources are significantly less expensive than industrial grades of magnesium oxide.

Olivine has not been seriously considered for refractory applications because of the impurities therein, notably the mineral faylaite. The presence of this iron bearing material is generally felt to form low melting phases which are inconsistent with ceramic firing steps and refractory applications. For purposes of this invention, however, the presence of faylaite is desirable because (1) there is no firing step, and (2) the heat capacity thereof is compatible with the objectives of the invention.

Another desirable source of magnesium oxide bearing material for utilization within this invention is the use of recycled magnesite linings utilized in steel making vessels. This material is normally considered to be unsatisfactory for use because of the iron content thereof. In accordance with this invention, however, the iron content thereof is totally compatible with the objectives of the invention in that an unfired heat storage device is produced.

Thus, in accordance with this invention, a magnesium oxide based heat storage material is one possessing greater than 35 percent by weight of magnesium oxide. Additionally other major oxides may be present in an amount from 0 to 65 percent by weight. Such major oxide materials are generally in the form of calcium oxide, iron oxide, aluminum oxide, silicon oxide and/or chromium oxide. Any one, all or none of the above oxides may be present in the magnesium oxide based heat storage material of this invention. While the composition is stated to be comprised of the various oxides, certain of the oxides will combine with the other of the oxides to form various combined phases. Those phases, however, will be a combination of or solution of various independent oxide phases.

The cast structure in accordance with this invention is formed by forming a slurry of the magnesium oxide based material and a calcium aluminate cement. Such a slurry is formed with the addition of sufficient water to give flow properties suitable for casting. Calcium aluminate cements are well known to ceramic industries and have been utilized for forming bonded refractories and systems other than the magnesium oxide system. Such cements have been avoided in the magnesium oxide systems because of the formation of low melting phases thus thought to render the material unsuitable for ceramic applications.

Calcium aluminate cements are described fully in a publication entitled Refractory Concretes, the American Concrete Institute publication No. ACI547R-79. A typical calcium aluminate cement sold under the trademark of LUMNITE CEMENT has the following composition in percentage by weight.

| Constituent | Percent by Weight |
|---|---|
| SiO$_2$ | 3.68 |
| Al$_2$O$_3$ | 45.14 |
| FeO | 10.14 |
| Fe$_2$O$_3$ | 6.53 |
| CaO | 33.45 |
| MgO | 0.50 |

Another typical calcium aluminate cement is sold under the name CA-25C by Alcoa. The composition by weight of this material is as follows:

| Constituents | Percent by Weight |
|---|---|
| Al$_2$O$_3$ | 79.0 |
| SiO$_2$ | 0.15 |
| Fe$_2$O$_3$ | 0.3 |
| Na$_2$O | 0.5 |
| CaO | 18.0 |
| Volatiles | 1.5 |

While the above compositions are typical of the calcium aluminate cements, all such cements are useful within the scope of this invention. It is preferred that the calcium aluminate cement be added to the magnesium oxide based heat storage material in an amount from about 5 to about 40 percent of the total composition. It should be realized, however, that a trade-off is involved with the combination. The greater the amount of calcium aluminate cement, the greater the strength of the resulting product. Concomitantly with the addition of calcium aluminate cement there is a slight reduction in the heat capacity of the resulting storage device. It is preferred that sufficient calcium aluminate cement be added to the magnesium oxide based material to result in a modulus of rupture of 1,000 lbs. per sq. in. or greater.

A slurry suitable for pouring into a mold is formed by adding water to the magnesium oxide based material and calcium aluminate cement in an amount from about 10 to about 30 percent by weight based on the total solid weights. Mixing is carried out within a large scale mixer until a mixture having a pourable consistency is achieved. Preferably the heating source, such as heating rods or resistive wires, are placed within the mold along with electrical connections and the slurry merely formed around the heating source. The forming process may be accompanied by vibration or the use of porous molds to assist moisture removal. Such forming processes are conventional and well known. Generally one day storage under normal atmospheric conditions is required prior to the stripping away of the mold material. At such time the product may be slowly dried to a temperature above 95° F. in order to remove the hydrates which decompose at lower temperatures. While it is required that the cast material be dried at a temperature in excess of 95° F., a preferred temperature for drying is approximately 240° F.

Remaining hydrates are generally stable to temperatures near 1500° F. which is satisfactory for use in this invention wherein the heating elements operate within the maximum range of 1500° to 1800° F. Because of the thermal gradients existing within the ultimate device of this invention, any disruptive action which may occur in the high temperature region would have no effect on the overall device because of the relatively low temperature of the outer portion of the device. The cooler outer portion contains and maintains the structural integrity of the inner portion of the device near the heating elements.

Having generally set forth the invention, the following specific examples are given as a further illustration thereof.

Example

Two mixes formed from North Carolina olivine and calcium aluminate cement sold under the trademark LUMNITE were prepared as follows:

| | Mixes | |
|---|---|---|
| Constituents | 1 | 2 |
| Olivine, −4 + 18 Mesh (U.S.) | 30 | 30 |
| Olivine, −18 + 60 Mesh | 30 | 30 |
| Olivine, −60 Mesh | 25 | 0 |
| Calcium Aluminate Cement | 15 | 40 |

The overall chemical compositions of these mixes are as follows:

| Constituent | Olivine | Cement | Mix 1 | Mix 2 |
|---|---|---|---|---|
| CaO | 1 | 34 | 5 | 14 |
| MgO | 49 | 1 | 42 | 30 |
| Fe$_2$O$_3$ | 7 | 16 | 8 | 11 |
| Al$_2$O$_3$ | 1 | 45 | 8 | 19 |
| SiO$_2$ | 40 | 4 | 35 | 26 |

Mixes 1 and 2 are combined with 20 percent water based upon the weight of solids and formed into a slurry. The slurry is poured into a mold having dimensions of 3 feet by 3 feet by 1 foot. The slurry is vibrated within the mold to remove bubbles and to assure conformation with the mold boundaries. The material is allowed to dry through the porous mold for a period of one day prior to stripping of the mold.

The cast material is slowly heated over a period of 5 hours to a temperature of about 240° F. where it is maintained for one hour. The thus formed magnesium hydroxide based heat storage device has a modulus of rupture in excess of 1,000 lbs. per sq. in.

The magnesium oxide based heat storage device is completed by attaching electrical leads to connections which pass from the heating elements to a connection box, as shown at 15, cast into the structure.

It is additionally contemplated to be within the scope of this invention to provide blocks of magnesium oxide heat storage material cast for the purpose of absorbing heat from a heat source such as a wood burning stove or a conventional fireplace for being transported to other rooms or environments to transfer heat to such environments. For example, a 25 lb. block of magnesium oxide based heat storage material may be heated on a wood stove to a temperature of approximately 800° F. and then transported by a portable handle to a protective cage within another room such as a bedroom for the purpose of providing heat to that room. In such an embodiment, no heat source need be embedded within the cast structure.

It is thus seen that by this invention a magnesium oxide based heat storage device is provided without the necessity for conventional ceramic sintering and firing processes. Additionally a process of producing such a heat storage device is provided by this invention wherein no firing step is utilized. It is further seen that this invention provides a novel technique of conveying heat from one environment to another utilizing a magnesium oxide based heat storage material. As variations will be apparent to those of skill in the art from a reading of the above specification which is exemplary in nature, the invention is to be limited only by the spirit and scope of the following appended claims.

That which is claimed:

1. A magnesium oxide based heat storage device, comprising:
   a heat source; and a
   cast magnesium oxide based heat storage material surrounding said heat source, said cast magnesium oxide based heat storage material comprising magnesium oxide in an amount greater than 35 percent by weight bonded with from 5 to 40 percent by weight of calcium aluminate cement.

2. The device according to claim 1 wherein said cast magnesium oxide based heat storage material is formed from a mineral selected from the group consisting of olivine, forsterite, recycled magnesite, talc, serpentine and mixtures thereof.

3. The device according to claim 1 wherein said cast magnesium oxide based heat storage material comprises magnesium oxide in combination with an oxide selected from the group consisting of calcium oxide, iron oxide, aluminum oxide, silicon oxide, chromium oxide and mixtures thereof.

4. The device according to claim 1 wherein said heat source comprises means for heating to temperatures in excess of 1500° F.

5. The device according to claim 4 wherein said heating means comprises electrical resistance heating means.

6. The device according to claim 5 wherein said electrical resistance heating means comprises resistive wire.

7. The device according to claim 5 wherein said electrical resistance heating means comprises resistive rods.

8. A process for storing and distributing heat, comprising the steps of:
   placing a cast magnesium oxide based heat storage material in heat transfer communication with a source of heat to raise the temperature thereof and thereby store heat, said cast magnesium oxide based heat storage material comprising magnesium oxide in an amount greater than 35 percent by weight bonded with from 5 to 40 percent by weight of calcium aluminate cement
   removing said cast magnesium oxide based heat storage material from heat transfer communication with said heat source; and
   placing said heat storage material in heat transfer relationship with an environment to be heated, whereby the temperature of said heat storage material is lowered as heat is transferred to said environment.

9. The process according to claim 8 wherein said cast magnesium oxide based heat storage material is formed from a mineral selected from the group consisting of olivine, forsterite, recycled magnesite, talc, serpentine and mixtures thereof.

10. The process according to claim 8 wherein said cast magnesium oxide based heat storage material comprises magnesium oxide in combination with an oxide selected from the group consisting of calcium oxide, iron oxide, aluminum oxide, silicon oxide and chromium oxide and mixtures thereof.

11. A process for forming an magnesium oxide based heat storage device, comprising the steps of:
   preparing a castable slurry comprising a magnesium oxide based material and a calcium aluminate cement;
   casting said slurry about and into heat transfer relationship with a source of heat; and
   drying and curing said slurry to form a dimensionalkyl stable heat storage device formed of a magnesium oxide based heat storage material, said cast magnesium oxide based heat storage material comprising magnesium oxide in an amount greater than 35 percent by weight bonded with from 5 to 40 percent by weight of calcium aluminate cement.

12. The process according to claim 11 wherein said step of drying and curing is carried out at a temperature greater than 95° F.

* * * * *